United States Patent [19]

Jensen

[11] 4,280,618

[45] Jul. 28, 1981

[54] DEVICE FOR HANDLING MEAT LOGS AND OTHER ARTICLES

[75] Inventor: James H. Jensen, Eau Claire, Wis.

[73] Assignee: Armour and Company, Phoenix, Ariz.

[21] Appl. No.: 44,183

[22] Filed: May 31, 1979

Related U.S. Application Data

[63] Continuation of Ser. No. 825,908, Aug. 19, 1977, abandoned.

[51] Int. Cl.³ .................................................. B65G 13/12
[52] U.S. Cl. .................................... 198/782; 17/32; 83/157; 271/189; 414/82
[58] Field of Search ..................... 414/82, 84; 83/157; 198/782, 424, 862; 271/192, 189; 17/32

[56] References Cited

U.S. PATENT DOCUMENTS

| | | | |
|---|---|---|---|
| 2,733,921 | 2/1956 | Downs | 271/192 X |
| 2,947,428 | 8/1960 | Curtenius | 414/82 |
| 3,108,509 | 10/1963 | Felix | 83/157 X |
| 3,491,902 | 1/1970 | Waldura | 414/82 |
| 3,525,443 | 8/1970 | Pomara, Jr. | 414/82 X |
| 3,848,725 | 11/1974 | Toby | 198/782 |
| 4,026,421 | 5/1977 | Lotz | 271/192 X |

FOREIGN PATENT DOCUMENTS 1098418  3/1955  France .................................. 414/82

Primary Examiner—J. M. Meister
Attorney, Agent, or Firm—Frank T. Barber; Carl C. Batz

[57] ABSTRACT

A device for handling articles such as meat logs which includes a main conveyor and means for moving the articles transversely and consecutively above and across the main conveyor to a predetermined position, and having automatic means operable when each article reaches the desired position over the main conveyor, for opening the device to allow the article to fall down on the main conveyor.

4 Claims, 5 Drawing Figures

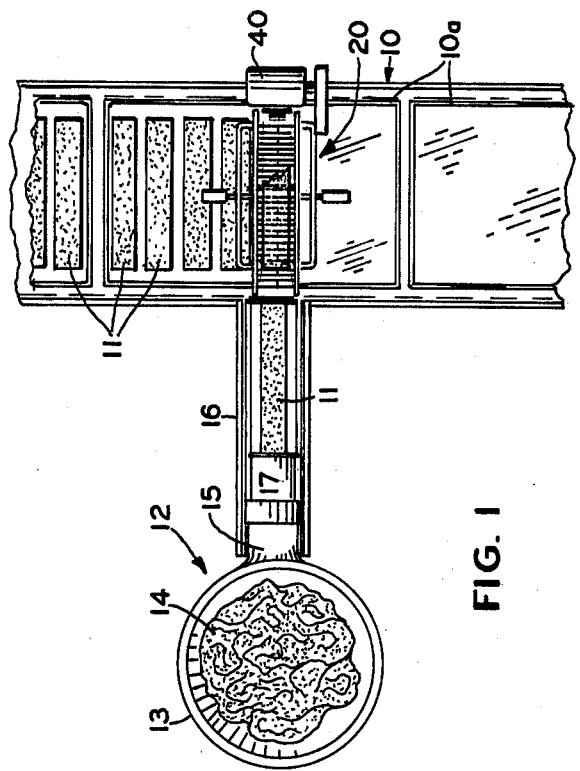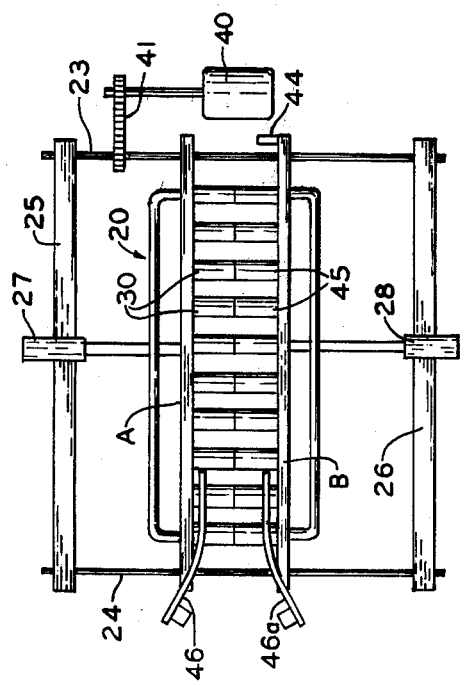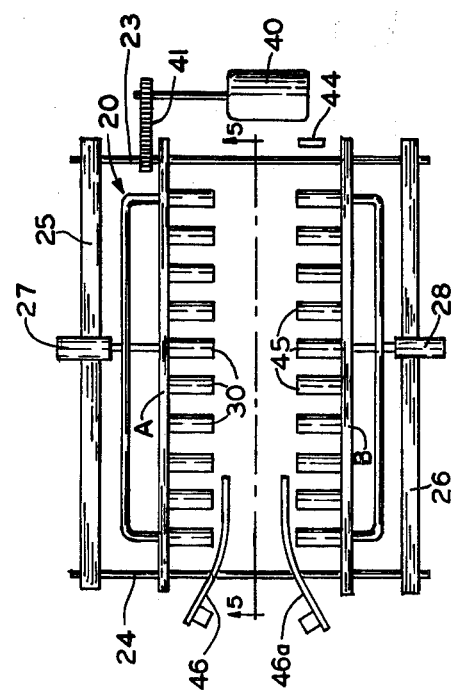

DEVICE FOR HANDLING MEAT LOGS AND OTHER ARTICLES

This is a continuation of application Ser. No. 825,908, filed Aug. 19, 1977, now abandoned.

This invention relates to an article handling device, and more particularly to a device for forming meat logs or other articles and placing them in a prescribed position on a main conveyor.

BACKGROUND OF THE INVENTION

In commercial meat packing operations where meat is being prepared for use as hamburger patties or as meat loaf, it has been the practice to comminute the meat, blend it and pass the comminuted meat through an extruder which presses and forms the meat to make a uniform cross-section. The extruded meat is cut into desired lengths to make logs and the logs transferred by hand onto a main conveyor. A typical size of the meat logs may be about 3"×3"×24". In a later stage of the packing operation the logs may be sliced into patties having dimensions of about 3"×3"×½". The log forming, cutting, and handling operations have caused difficulties in the past.

According to the prior practice a main conveyor is provided for carrying the logs away from the log forming apparatus. An operator normally stands by this main conveyor and with his hands picks up the meat log after it has been cut into lengths and places it into the mouth of a guide through which the log drops down onto the main conveyor. The object is to pick up the log and pass it through the guide and onto the conveyor so that the logs are consecutively placed one after another with a space of about one inch between logs, and to do this without breaking, bending or otherwise distorting the log. At this point in the processing, the logs are quite fragile and easily broken. The operator has only his two hands to support the log and any inaccuracy in placing the log may result in contact of the log with the guide structure or with the log previously placed which results in breaking or distortion of the logs. Further, the temperature of the meat is critical with respect to its ability to hold together, and in the past it has been necessary to hold the temperature within very narrow limits.

Such operations have a number of disadvantages. The logs may weigh about seven to nine pounds each and it is a tiring and unpleasant job to lift the logs and to be careful to accurately place them at the constant and rapid rate that is required on a production line. Also due to the fragile nature of the logs there is always a substantial percentage of the logs which are broken, bent or distorted. This is a serious problem. The broken or distorted logs may run as high as 30% of the logs handled and all the broken parts have to be collected and carried back to be mixed and formed all over again.

We have set about to discover ways to solve the problems and difficulties above pointed out and to provide a device which is capable of performing the required functions in the handling of the meat logs. It is desired to perform the handling of the logs more accurately and more efficiently than could be done by hand. It is further desired that our improved device be applicable also to the handling of articles other than the meat logs which are specifically referred to herein.

DETAILED DESCRIPTION

One embodiment of the improved device as illustrated in the accompanying drawings in which FIG. 1 is a schematic plan view showing the main conveyor, the apparatus for extruding the meat, and the apparatus for passing the meat logs transversely to the main conveyor;

FIG. 3 is a detailed plan view of the mechanism for dropping the logs onto the main conveyor, showing the jaws in the closed condition to provide a platform for the logs;

FIG. 4 is a view similar to FIG. 3 except that the jaws are shown in open position to permit the logs to drop therethrough.

Figure 2:
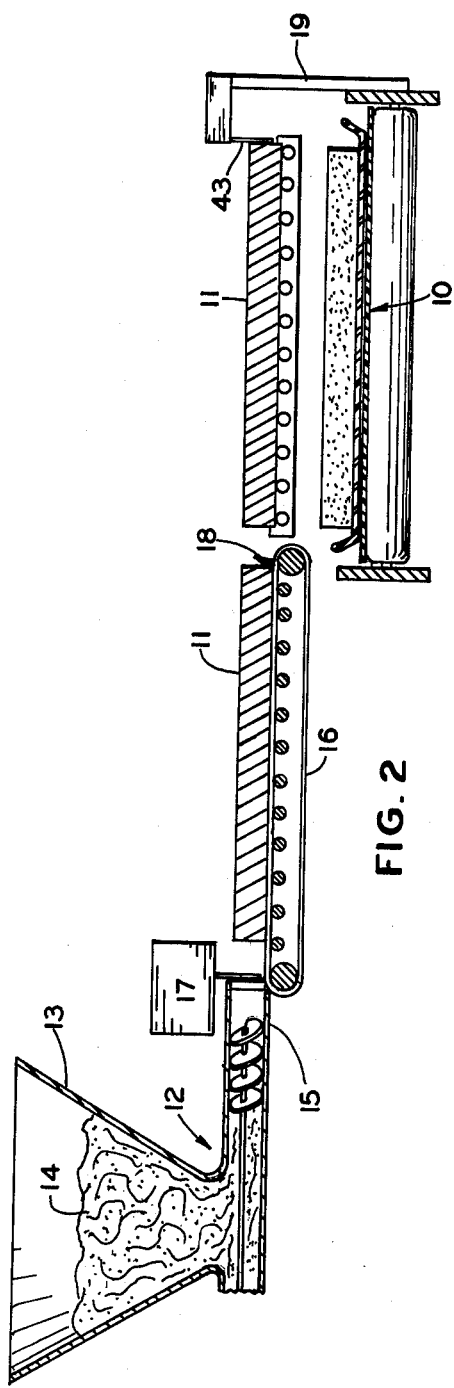
FIG. 2 is a schematic view in side elevation of the apparatus shown in FIG. 1.

As illustrated, particularly in FIGS. 1 and 2, the improved device includes a main conveyor 10 which includes trays 10a set on top of the conveyor bed. The logs 11 are placed on the trays being placed one after another with a spacing between the logs.

The extruding apparatus 12 is located at a position which is to one side of and spaced from the main conveyor 10. This includes the hopper 13 into which the comminuted and blended meat 14 is placed. Operation of the extruder presses the meat from the hopper through the horn 15 from which it emerges suitably in generally square cross-section and passes onto the conveyor 16 which moves the extruded meat in a transverse direction toward the main conveyor.

For cutting the extruded meat into lengths to provide logs, we provide the cutter means 17 which has a pivoted trip lever 18. When the forward end of the extruded meat pushes the trip lever 18 this lever pivots downwardly out of the path of the meat on this conveyor and operates the cutter 17 which results in severing the meat issuing from horn 15. The cutter 17 and its trip lever 18 are known to the art and are not described in detail herein. Simultaneously with the cuttting function, the cutting device 17 operates to interrupt the extrusion of the meat so that the resulting logs on conveyor 16 will be separated.

Mounted in the frame 19 and located above the main conveyor 10 is the mechanism 20 for positioning and dropping the logs. This mechanism includes a pair of jaws A and B. A pair of rods 23 and 24 are mounted at their ends in frame members 25 and 26 of the general frame structure 19. The mounting of rod 23 in the frame members 25 and 26 is of a type which will permit rotation of this rod in the frame members. The jaw A has its sides slideably mounted on rods 23 and 24 and similarly the jaw B has its sides slideably mounted on rods 23 and 24. Mounted on frame member 25 is a fluid cylinder 27 which has its piston rod attached to jaw A, and similarly the fluid cylinder 28 is mounted on frame member 26 and has its piston rod attached to jaw B.

When cylinders 27 and 28 have their pistons extended the jaws A and B are together and the jaws are in closed condition. When these cylinders have their pistons withdrawn, the jaws A and B are in open condition with the jaws separated.

Jaw A has a series of rollers 30 each of these rollers being spaced from and having its longitudinal axis parallel with the longitudinal axis of the others. These rollers may each be rotatably mounted on a pin which at its end is secured to the backing member 31 of jaw A.

Figure 5:
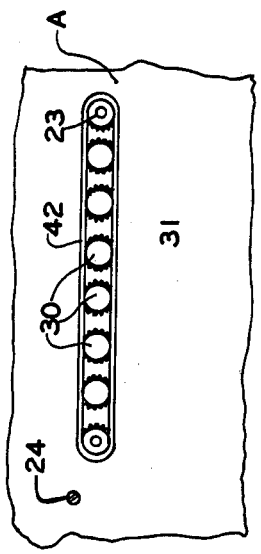
FIG. 5 is a detailed view taken along line 5—5 of FIG. 4 showing means for rotating the rollers which are illustrated in FIGS. 3 and 4.

For rotating the rollers 30 of jaw A we provide the motor 40 which is mounted on frame 19 in which through chain 41 drives the rod 23. Referring now to FIG. 5, the rod 23, through chain 42, drives each of the rollers 30.

The jaw B includes rollers 45 which match with and abut rollers 30. Jaw B also has a chain similar to chain 41 which engages and drives each of rollers 45, the chain being driven, as is chain 42, by the rod 23. The ends of rollers 45 abut the ends of rollers 30 and are of the same size and at the same level, so that when the jaws are closed the tops of the rollers 30 and 45 provide a platform on which the articles being handled may rest. The drive for each of rollers 30 and 45 is arranged to move the articles riding thereon over and across the main conveyor. The speed at which the rollers are driven is related to the lineal speed at which the conveyor 16 is driven and the rate at which the main conveyor is driven such that the logs or other articles are delivered to the rolls and into a predetermined position over the main conveyor where they trip the mechanism for dropping the log or other article after the last previously dropped article has moved on the main conveyor to a position where it is out of the way of the instant article being dropped, leaving a small space between the articles on the conveyor.

The trip 43 when operated by the article which is moved into the position where it is to be dropped, switches the fluid to the other side of the piston at each of cylinders 27 and 28 which moves jaws A and B quickly to their open position shown in FIG. 4 so permitting the log or other article to fall between the jaws and to be placed on conveyor 10 beside the prior log placed on this conveyor.

OPERATION

To review the sequence of the operation of the device in connection with the handling of meat logs, the hopper is filled with comminuted and blended meat. We will assume that the motor 40 has been started in operation, rollers 30 and 45 are being rotated, and the jaws A and B are together so as to present a moving platform on top of the rollers.

The extruder is started in operation and the extruded meat is laid down on conveyor 16. At this time the knife of the cutter 17 is retracted so that the extruded meat may pass. When the forward end of the extruded meat contacts and moves the trigger 18 downwardly, this causes the cutter 17 to cut the meat and so form the meat log. Operation of the cutter causes interruption in the extrusion which allows the log which has been cut off to separate from the mass being extruded. Further operation of the conveyor 16 passes the log onto the platform which is provided by the tops of rollers 30 and 45. We may observe that the end of the conveyor 16 and the platorm provided by rollers 30 and 45 catch the log and pass it on in a direction transverse with the movement of the main conveyor until the log comes to the predetermined position where the forward end of the log strikes and operates the dropper trip 43. This actuates the fluid cylinders 27 and 28 so as to quickly separate jaws A and B, thus opening a slot between jaws A and B through which the log drops to its position on the main conveyor and where the log is spaced from the previously dropped log.

We have thus far regarded the trays 10a as a part of the main conveyor. However, the trays 10a when they are filled and have been moved beyond the position in which the logs are dropped, may be taken from the main conveyor and packaged or sent through other processing treatments. It is an advantage of the improved device that the logs are uniformly spaced and the trays filled to capacity.

In order to cause the line of division between the rollers 30 and 45 to be in the center of the path of the meat log, we provide a stop member 44 which is attached to frame 19 to limit the closed position of one of the jaws. As to the other jaw, its cylinder operates to push rollers into abuttment with the rollers of the jaw which has been stopped.

Also to be sure that the logs move along the center path over the rollers 30 and 45, we provide the guides 46 and 46a also attached to frame 19 between which the logs may pass onto the platform provided by the rollers.

After the passage of the log each of the trip members 17 and 14 reset themselves and the cylinders 27 and 28 operate to again close the jaws A and B, and the device is ready for another cycle of operation.

While we have described in detail only one embodiment of the invention it will be apparent to those skilled in the art that many other embodiments may be constructed and many changes may be made, and all such changes and embodiments are considered within the spirit of the invention and within the scope of the appended claims.

What is claimed:

1. A device for handling meat log or like article comprising a main conveyor on which the article may be supported for removal in a forward direction from the device, a frame, a pair of jaws supported by said frame and above said main conveyor, each of said jaws having a series of spaced rollers, said rollers having their tops in a horizontal plane to provide a platform on which said article may be supported, means for driving said rollers on each of said jaws about their axes whereby to propel articles on said platform above and transversely of said main conveyor, and means for moving said jaws apart horizontally while maintaining the tops of said rollers in the same plane to permit said article to drop between the jaws onto said conveyor, said jaws being slidable along a horizontal path in said frame, said jaw moving means being effective to slide said jaws along said path, a pair of rods mounted for rotation in said frame, motor drive means for driving one of said rods in rotary movement and means for connecting said one rod and said rollers in drive relationship whereby rotation of said one rod drives said rollers.

2. A device as set forth in claim 1 in which said jaws are slidably mounted on said rods and are movable along said rods between their open and closed positions.

3. A device as set forth in claim 1 in which said rods are mounted in said frame with their axes extending horizontally.

4. A device as set forth in claim 2 in which said rods are spaced and in which one side of each of said jaws is slidable along one of said rods and the other side of each of said jaws is slidable along the other of said rods.

* * * * *